(12) United States Patent
Ichimaru

(10) Patent No.: US 7,740,462 B2
(45) Date of Patent: Jun. 22, 2010

(54) TIRE VULCANIZER

(75) Inventor: Hironobu Ichimaru, Chikugo (JP)

(73) Assignee: Ichimaru Giken Co., Ltd., Chikugo-shi, Fukuoka (JP)

( * ) Notice: Subject to any disclaimer, the term of this patent is extended or adjusted under 35 U.S.C. 154(b) by 115 days.

(21) Appl. No.: 12/089,387

(22) PCT Filed: Oct. 4, 2006

(86) PCT No.: PCT/JP2006/320246
§ 371 (c)(1),
(2), (4) Date: Apr. 4, 2008

(87) PCT Pub. No.: WO2007/043549
PCT Pub. Date: Apr. 19, 2007

(65) Prior Publication Data
US 2009/0263524 A1    Oct. 22, 2009

(30) Foreign Application Priority Data
Oct. 5, 2005    (JP) .............................. 2005-292607

(51) Int. Cl.
*B29C 35/04* (2006.01)
(52) U.S. Cl. .............................. 425/31; 425/36; 425/38; 425/58
(58) Field of Classification Search .................. 425/31, 425/36, 38, 43, 48, 52, 58
See application file for complete search history.

(56) References Cited

U.S. PATENT DOCUMENTS

| | | | |
|---|---|---|---|
| 3,833,324 A * | 9/1974 | Klopper et al. .............. 425/31 |
| 3,909,337 A * | 9/1975 | Yabe .......................... 425/31 |
| 4,486,259 A | 12/1984 | Irie |
| 5,853,526 A * | 12/1998 | Laurent et al. ............... 425/36 |
| 6,620,367 B1 * | 9/2003 | Mitamura .................... 425/31 |
| 6,682,687 B1 | 1/2004 | Mitamura et al. |
| 6,702,977 B2 * | 3/2004 | Girard et al. ................. 425/36 |
| 6,969,440 B2 | 11/2005 | Takagi |
| 7,001,559 B2 * | 2/2006 | Oobayashi et al. ........... 425/31 |
| 2002/0079041 A1 | 6/2002 | Oobayashi et al. |
| 2005/0016995 A1 | 1/2005 | Mitamura et al. |

FOREIGN PATENT DOCUMENTS

| | | |
|---|---|---|
| GB | 868831 A | 5/1961 |
| JP | 53-34879 | 3/1978 |
| JP | 61-57314 A | 3/1986 |
| JP | 2-295727 | 12/1990 |
| JP | 2001-96534 | 4/2001 |
| JP | 2002-120228 | 4/2002 |
| JP | 2002-178333 | 6/2002 |
| JP | 2003-25459 A | 1/2003 |
| JP | 2003-53731 | 2/2003 |

* cited by examiner

*Primary Examiner*—James Mackey
(74) *Attorney, Agent, or Firm*—Dickstein Shapiro LLP

(57) ABSTRACT

The invention provides a tire vulcanizer having a vulcanizer body and a shaping unit and configured to be able to accurately mount a green tire in the shaping unit and shape it accurately when shaping the green tire in the shaping unit. As a result, the green tire can be placed and set accurately in a lower container of the vulcanizer body when the shaping unit is placed in a container of the vulcanizer body. In order to mount the green tire in the shaping unit (B) outside the vulcanizer body, the tire vulcanizer includes outside the vulcanizer body (A) a tire mounting device (D) which mounts the green tire in the shaping unit.

6 Claims, 13 Drawing Sheets

STEP1

STEP2

STEP3

STEP4

STEP5

STEP6

STEP7

STEP1

STEP2

STEP3

STEP4

STEP5

STEP6

STEP7

STEP1

STEP2

STEP3

STEP4

STEP5

STEP6

STEP7

TIRE VULCANIZER

CROSS-REFERENCE TO RELATED APPLICATION

The present application is an international application No. PCT/JP2006/320246 designating the U.S. and claims priority from Japanese Patent Application No. 2005-292607, filed on Oct. 5, 2005, the disclosure of which is hereby incorporated by reference in its entirety.

BACKGROUND OF THE INVENTION

1. Field of the Invention

The present invention relates to a tire vulcanizer in which a green tire is mounted and shaped in a shaping unit outside a vulcanizer body and then the green tire is vulcanized in a state that the shaping unit is moved and set in the vulcanizer body, and particularly it relates to a tire mounting technique for mounting a green tire in the shaping unit outside the vulcanizer body.

2. Description of the Related Art

According to prior art tire vulcanization methods such as one disclosed in Japanese Laid-open Patent Application Publication No. 2002-120228, for shaping a green tire, the green tire is set in a center mechanism of a vulcanizer and a bladder of the center mechanism is inflated with a pressurized fluid to thereby make the outer circumference of a bladder in tight contact with the inner circumference of the green tire.

Next, the green tire is held in a container of the vulcanizer, and then the inner circumference thereof is pressed into the bladder supplied with a high-temperature and pressure fluid, thereby vulcanizing the green tire by heat from the bladder and the container.

However, such a prior art tire vulcanization method has a problem that the green tire is set in the center mechanism of the vulcanizer for shaping so that pre-vulcanization processing takes a long time, causing a reduction in work efficiency.

In view of solving the above problem, in prior art there has been proposed a tire vulcanizer disclosed in Japanese Laid-open Patent Application Publication No. 2003-537312 which shapes a green tire with a shaping unit outside a vulcanizer body and vulcanizes the shaped green tire with the shaping unit kept set in the vulcanizer body.

This prior art tire vulcanizer includes a shaping unit for off-line setup, that is, mounting a green tire outside the vulcanizer body and shaping the green tire.

Thus, the use of the shaping unit has an advantage of improved work efficiency since just setting in the vulcanizer body the green tire shaped thereoutside enables immediate start of vulcanization.

In order to manufacture tires with high performance, however, it is essential to not only accurately mold the green tire but also to set the green tire in a container of the vulcanizer body accurately without positional and directional displacement.

Therefore, for shaping the green tire in the shaping unit, it is necessary to mount the green tire in the shaping unit accurately and shape it accurately.

In this point, the shaping unit of the prior art tire vulcanizer is structured exactly the same as the center mechanism of the tire vulcanizer disclosed in Japanese Laid-open Patent Application Publication No. 2002-120228 above and it lacks a beadlock for the green tire.

Having such a structure as that of the center mechanism, a problem arises that the structure thereof is complicated since it needs to have a center post, a cylinder and the like.

Furthermore, due to the lack of beadlock for the green tire, there is a problem that the green tire is likely to be positionally or posturally displaced when mounted in the shaping unit, and accordingly it cannot be mounted and shaped in the shaping unit accurately.

In view of solving the above-identified problems, the present invention aims to provide a tire vulcanizer with a vulcanizer body and a shaping unit in which the green tire is accurately mounted and accurately shaped in the shaping unit so that the green tire can be set accurately in a lower container of the vulcanizer body when the shaping unit is placed in a container thereof.

DISCLOSURE OF THE INVENTION

In view of solving the above problems, according to the present invention a tire vulcanizer is configured to comprise a shaping unit including a bladder made of inflatable tubular rubber, a clamp ring which fixes one end of the bladder, a clamp ring which fixes the other end of the bladder, and a fluid supply/discharge channel through which a pressurized fluid is supplied/discharged to/from an inside of the bladder, in which a green tire is mounted and shaped in the shaping unit outside a vulcanizer body and then the green tire is vulcanized in a state that the shaping unit is moved and set in the vulcanizer body. The tire vulcanizer is configured to further comprise a tire mounting device which mounts the green tire in the shaping unit outside the vulcanizer body and comprises right and left clamp members being detachable from the clamp rings respectively and rotatable, in which the right and left clamp members incorporate beadlocks which lock right and left bead portions of the green tire set in a periphery of the bladder of the shaping unit by directly engaging them with lock nails, and position the right and left bead portions at shaping positions; and one of the right and left clamp members has formed therein a connection channel which is connected with the fluid supply/discharge channel of the shaping unit to supply a fluid to inside of the bladder and inflate the bladder in a state that the right and left bead portions are locked with the beadlocks, so that the outer circumference of the inflated bladder is made in tight contact with an inner circumference of the green tire for shaping the green tire.

Further, according to a second aspect of the present invention, the tire vulcanizer is configured that the green tire set in the periphery of the bladder of the shaping unit is a molded green tire assembled in a separate process.

Further, according to a third aspect of the present invention the tire vulcanizer is configured that after shaping of the molded green tire is completed, an outer form thereof is adjusted.

Further, according to a fourth aspect of the present invention, the tire vulcanizer is configured that the green tire set in the periphery of the bladder of the shaping unit is an intermediate green tire assembled in a separate process; and the intermediate green tire is molded into the green tire while the green tire is shaped by the supply of the fluid from the connection channel.

Further, according to a fifth aspect of the present invention, the tire vulcanizer is configured to further comprise a receiving plate which prevents outer surface of the bead portions from outwardly protruding when the bead portions are locked by the beadlocks.

DETAILED DESCRIPTION OF THE PREFERRED EMBODIMENTS

Figure 1:
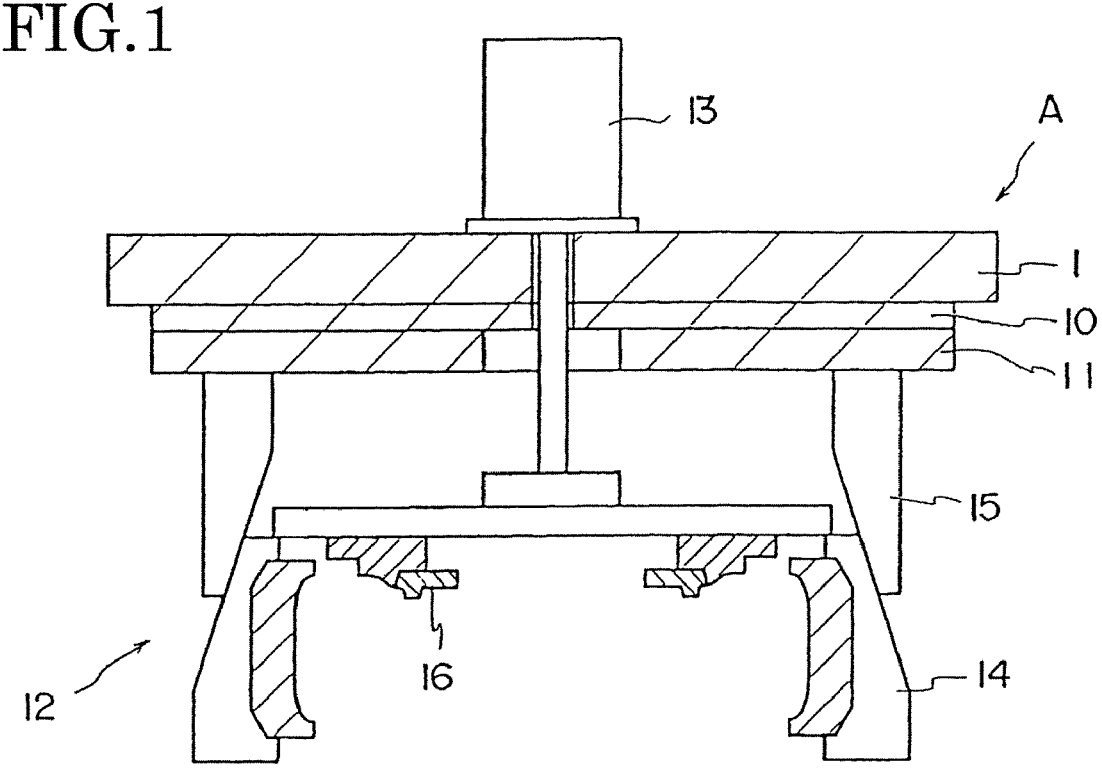
FIG. 1 is a cross section of a shaping unit set in a lower container of a vulcanizer body.
Figure 1:
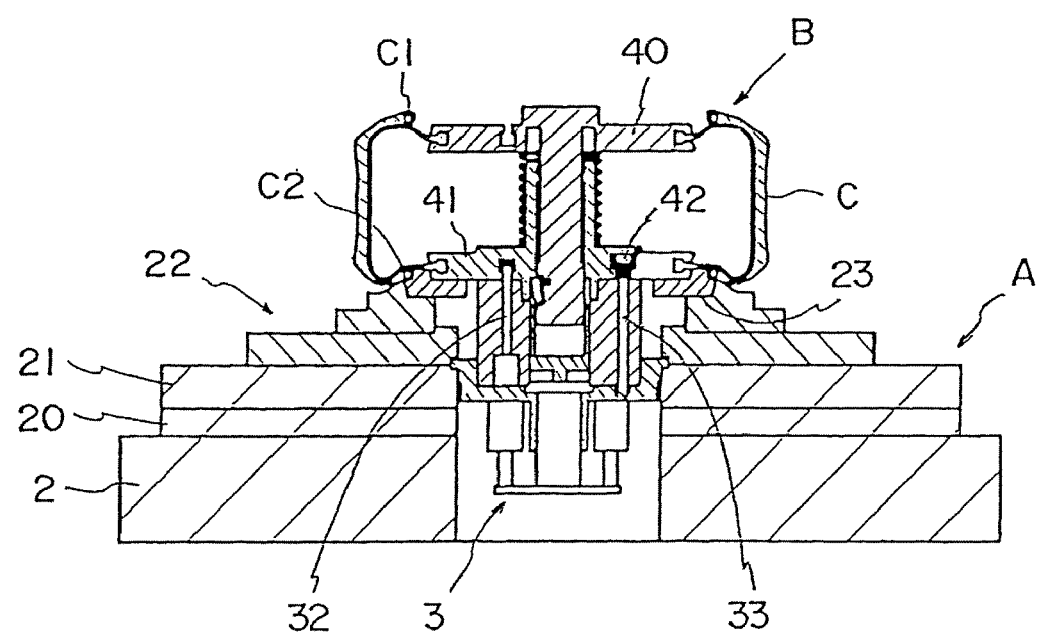
Figure 2:
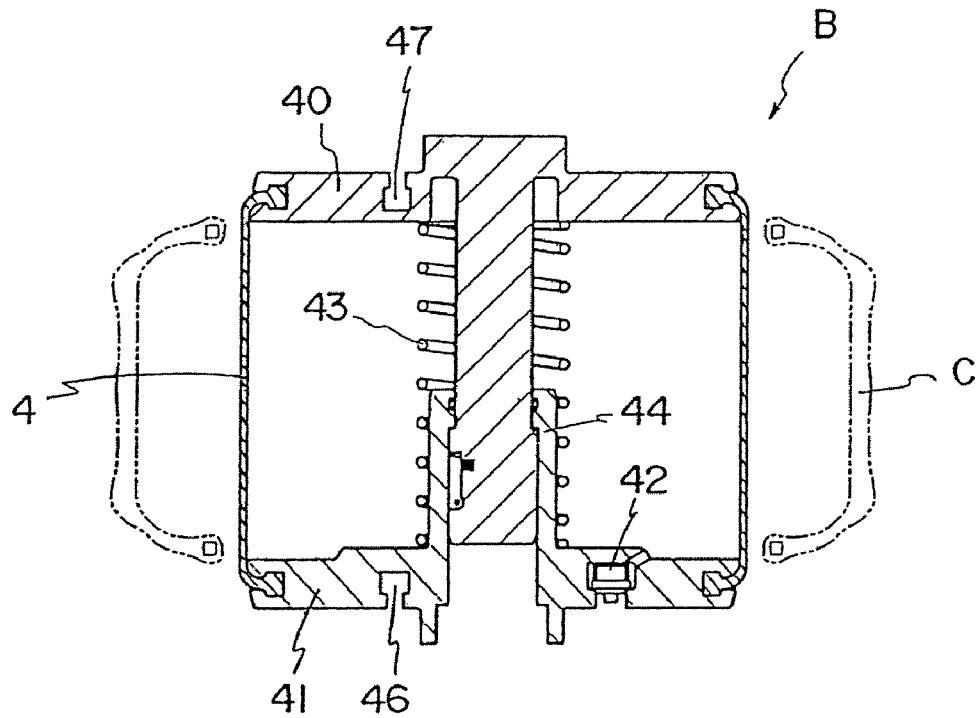
FIG. 2 is a cross section of the shaping unit in an extended state.
Figure 3:
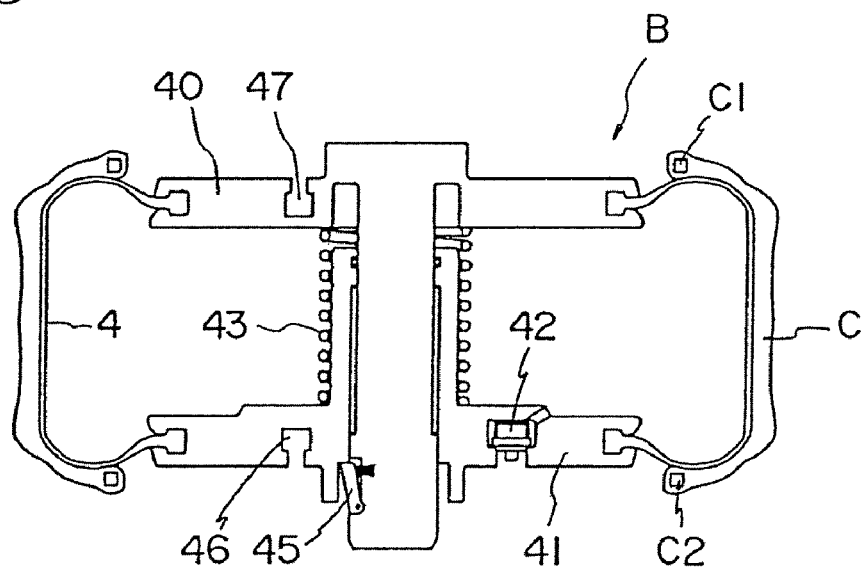
FIG. 3 is a cross section of the shaping unit in a shaping state.

FIG. 1 is a cross section of a shaping unit set in a lower container of a vulcanizer body, FIG. 2 is a cross section of the shaping unit in an extended state, and FIG. 3 is a cross section of the shaping unit in a shaping state.

A tire vulcanizer according to the present embodiment comprises a vulcanizer body A and a shaping unit B which is detachable from the vulcanizer body A.

As shown in FIG. 1, the vulcanizer body A comprises an upper container 12 mounted in a bolster plate 1 via an insulator bolster 10 and a bolster platen 11, and a lower container 22 mounted in a bottom plate 2 via an insulator bottom 20 and a bottom platen 21. The bolster plate 1 and the bottom plate 2 are supported in such a manner as to relatively move in a vertical direction.

In the present embodiment, it is configured that the bottom plate 2 is fixed and the bolster plate 1 is elevated/descended by a not-shown cylinder body.

The upper container 12 has an elevation cylinder 13 mounted in the bolster plate 1 and the elevation cylinder 13 has mounted therein a segment mold 14 which is divided into plural segments so that as the elevation cylinder 13 elevates or descends, the segment mold 14 expands or shrinks radially along an expandable guide 15.

In the center portion of the upper container 12 an upper bead support ring 16 is provided to retain an upper bead portion C1 of a green tire C when the shaping unit B in a shaping state is set in the vulcanizer body A.

The lower container 22 is mounted on the bottom plate 2 to retain the shaping unit B with the segment mold 14, and provided with a lower bead support ring 23 in the center thereof.

The lower bead support ring 23 retains a lower bead portion C2 of the green tire C when the shaping unit B in a shaping state is set in the vulcanizer body A.

The center mechanism 3 is provided in the center of the lower container 22. The center mechanism 3 comprises a clamp rod 32 fixing the shaping unit B and a fluid channel 33 communicated with a fluid port 42 of the shaping unit B.

The green tire C is mounted in the shaping unit B outside the vulcanizer body A and the shaping unit B with the green tire C mounted thereon is set in the vulcanizer body A.

As shown in FIG. 2, the shaping unit B comprises a bladder 4 made of inflatable tubular rubber, an upper clamp ring 40 fixing an upper end of the bladder 4, a lower clamp ring 41 fixing a lower end of the bladder 4, and a fluid port 42 through which a pressurized fluid is supplied/discharged to/from the inside of the bladder 4. The upper and lower clamp rings 40, 41 are supported approachably/separably by a spring 43 and generally supported by the spring 43 in a state that they are biased to distance away from each other.

In addition, the upper and lower clamp rings 40, 41 are formed to be latched by a latch portion 44 at a bladder extended position (shown in FIG. 2) at which they are distanced away from each other so that the outer diameter of the bladder 4 is to be smaller than the inner diameter of the green tire C.

Further, the upper and lower clamp rings 40, 41 are formed to be latched by a latch portion 45 at a shaping position (shown in FIG. 3) at which they approach each other so that the outer circumference of the bladder 4 is to be made in tight contact with the inner circumference of the green tire C.

The fluid port 42 is provided in the lower clamp ring 41 (or upper clamp ring 40), and incorporates a check valve to prevent a leakage of internal pressure so that it cannot discharge the pressurized fluid from the inside unless the check valve is released externally.

Figure 4:
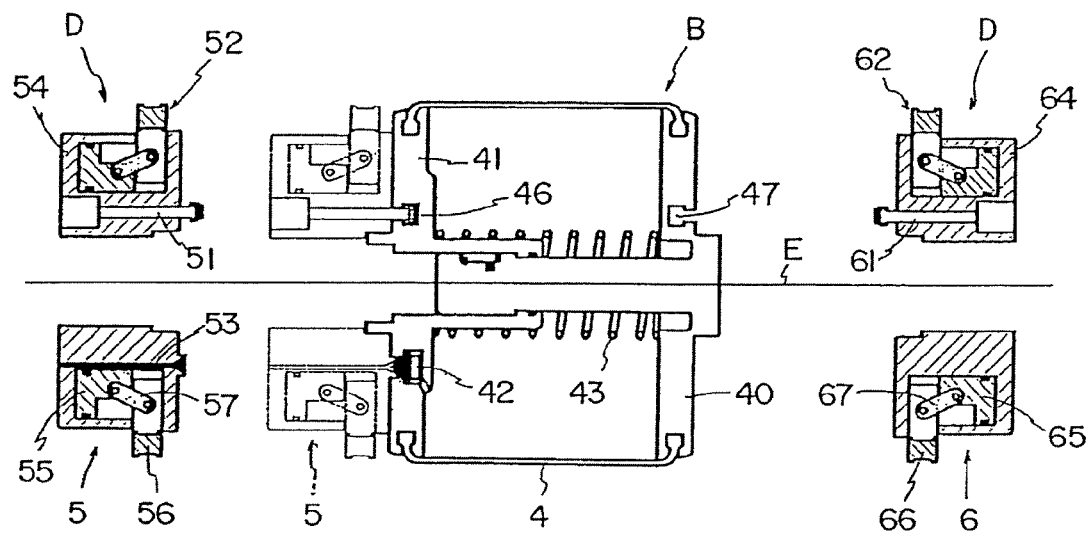
FIG. 4 is a cross section of a tire vulcanizer.

Next, FIG. 4 is a cross section of a tire mounting device.

In tire vulcanization, first the green tire C is mounted in the shaping unit B outside the vulcanizer body A by use of the tire mounting device D.

The tire mounting device D has a left clamp member 5 and a right clamp member 6 arranged on the same axial line E. The left clamp member 5 is detachable from the lower clamp ring 41 while the right clamp member 6 is detachable from the upper clamp ring 40.

The left and right clamp members 5, 6 are movable in opposite directions by a not-shown moving device and rotatable by a not-shown rotary device. The left and right clamp members 5, 6 comprise ring-like bodies 54, 64, clamp rods 51, 61, and beadlocks 52, 62, respectively, and the left clamp member has a connection channel 53 formed therein.

The clamp rods 51, 61 detachably connect the clamp members 5, 6 and the shaping unit B, and engage/disengage with/from clamp grooves 46, 47 formed in the clamp rings 41, 40 of the shaping unit B, respectively.

The beadlocks 52, 62 lock the upper and lower bead portions C1, C2 of the green tire C set in the periphery of the bladder 4 and also position them at their shaping positions, respectively.

The beadlocks 52, 62 have a plurality of lock nails 56, 66 arranged circumferentially and the lock nails 56, 66 are connected via by links 57, 67 with cylinders 55, 65 moving by fluid pressure and incorporated in the ring-like bodies 54, 64.

It is configured that the lock nails 56, 66 protrude radially peripherally by forward movement of the cylinders 55, 65 to engage with the bead portions C1, C2 while they retreat by backward movement of the cylinders 55, 65 to release the engagement with the bead portions C1, C2.

The connection channel 53 is formed in the left clamp member 5 to be connected with the fluid port 42 of the shaping unit B and supply a fluid to the inside of the bladder 4. It is configured that the connection channel 53 is communicated with the fluid port 42 when the left clamp member 5 is connected with the shaping unit B.

With use of thus-formed clamp members 5, 6, the green tire is mounted in the shaping unit B. The green tire can be a molded green tire assembled in a separate process or an intermediate green tire assembled in a separate process.

First, the first example of the tire mounting method in which the green tire C is a molded green tire 90 will be described with reference to FIGS. 5 to 11.

Figure 5:
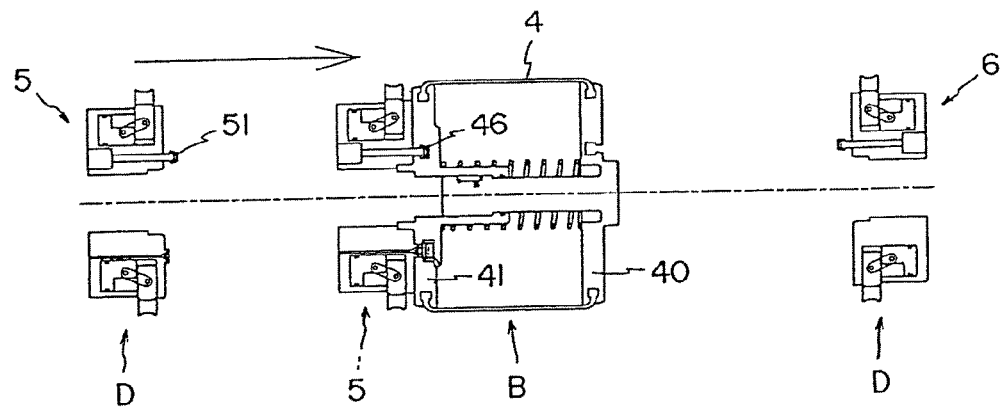
FIG. 5 is a process drawing for a first example of a tire mounting method.

(FIG. 5, Step 1)

The shaping unit B with an extended bladder 4 is moved by a not-shown transfer device from the vulcanizer body A to between the left and right clamp members 5, 6 constituting the tire mounting device D so that the left clamp member 5 is connected with the lower clamp ring 41 by engaging the clamp rod 51 with the clamp groove 46.

Figure 6:
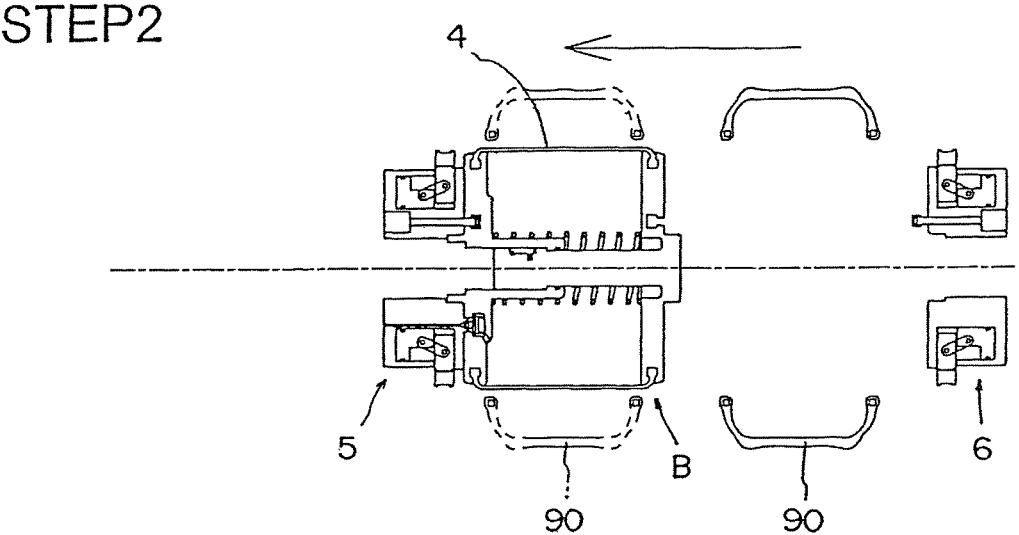
FIG. 6 is a process drawing for the first example of the tire mounting method.

(FIG. 6, Step 2)

The molded green tire 90 assembled in a separate process is moved to the periphery of the bladder 4 of the shaping unit B.

Figure 7:
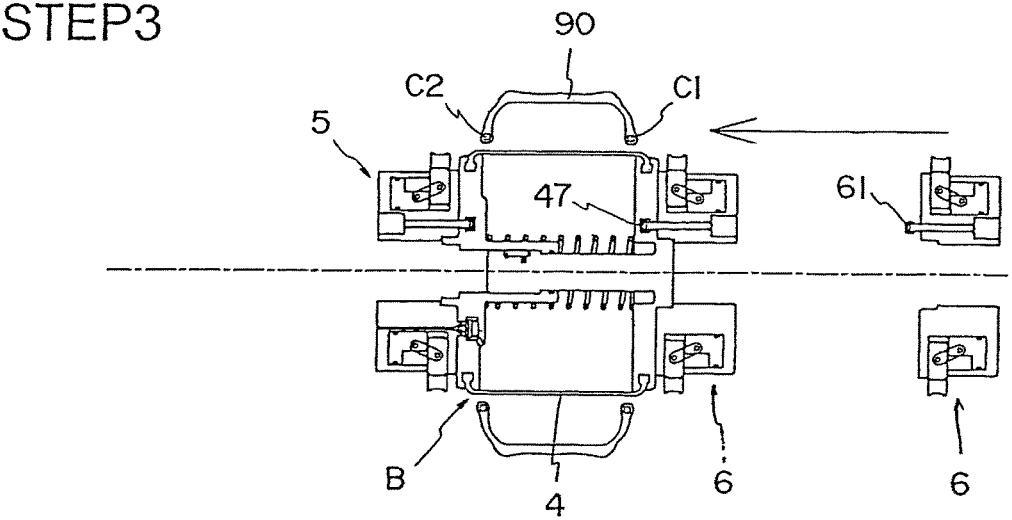
FIG. 7 is a process drawing for the first example of the tire mounting method.

(FIG. 7, Step 3)

The right clamp member 6 is connected with the upper clamp ring 40 of the shaping unit B by engaging the clamp rod 61 with the clamp groove 47.

Figure 8:
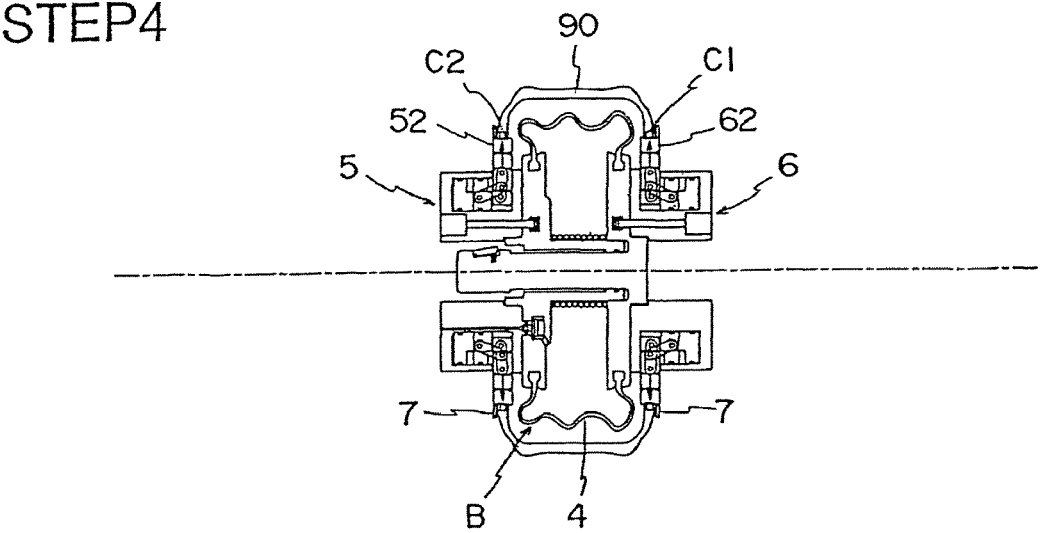
FIG. 8 is a process drawing for the first example of the tire mounting method.

(FIG. 8, Step 4)

The bead portions C1, C2 of the molded green tire 90 is internally locked by the beadlocks 52, 62 provided in the left and right clamp members 5, 6. Here, the bead portions C1, C2 can be locked at an appropriate position before the shaping position. Also, in order to prevent the bead portions C1, C2 from being deformed due to their outward protrusion, receiving plates 7 are provided to hold the outer surface of the bead portions C1, C2.

Figure 9:
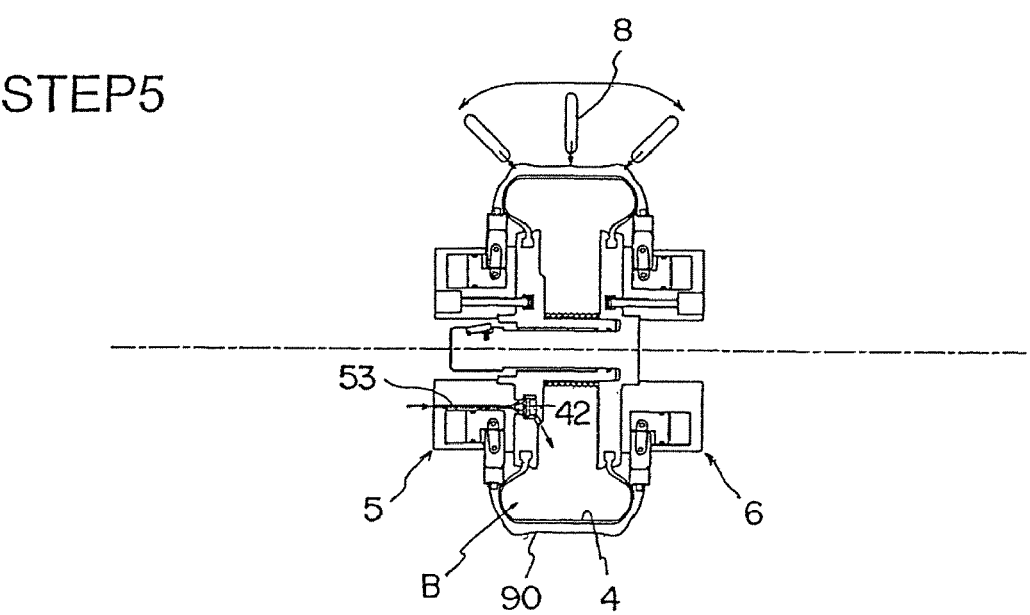
FIG. 9 is a process drawing for the first example of the tire mounting method.

(FIG. 9, Step 8)

The bladder 4 is inflated with a fluid supplied from the connection channel 53 through the fluid port 42. Thereafter, the left and right clamp members 5, 6 are moved in opposite directions to position the shaping unit B at the shaping position. Thereby, the outer circumference of the bladder 4 is made in tight contact with the inner circumference of the green tire 90 for shaping the green tire. Note that the bladder 4 can be also inflated after the shaping unit B is position at the shaping position.

Further, it is configured that upon completion of the shaping, the outer form of the green tire is adjusted by holding the outer surface of the green tire with a stitcher 8 (discoidal member presser). However, adjustment of the outer form by the stitcher 8 is not always necessary.

Figure 10:
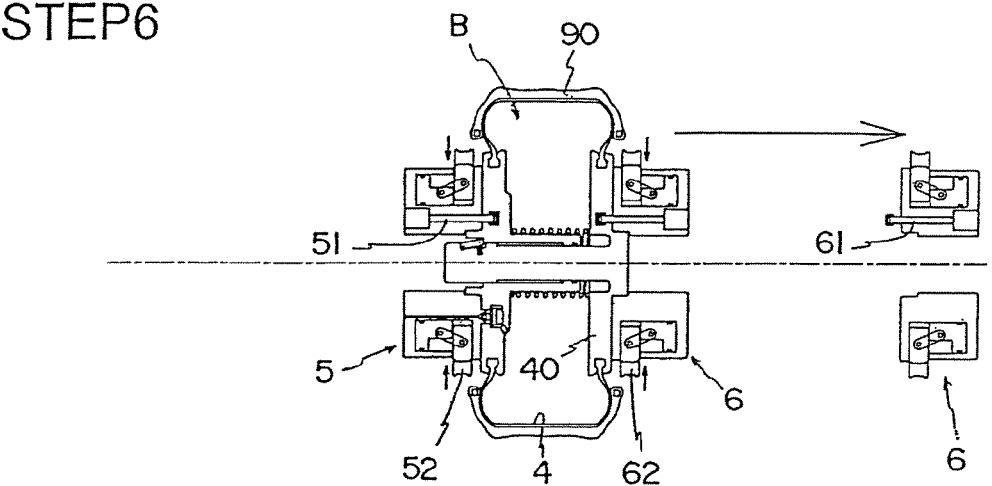
FIG. 10 is a process drawing for the first example of the tire mounting method.

(FIG. 10, Step 6)

By release of the left and right beadlocks 52, 62, the engagement of the clamp rods 51, 61 and the clamp grooves 46, 47 are released, thereby separating the right clamp member 6 from the upper clamp ring 40 of the shaping unit B.

Figure 11:
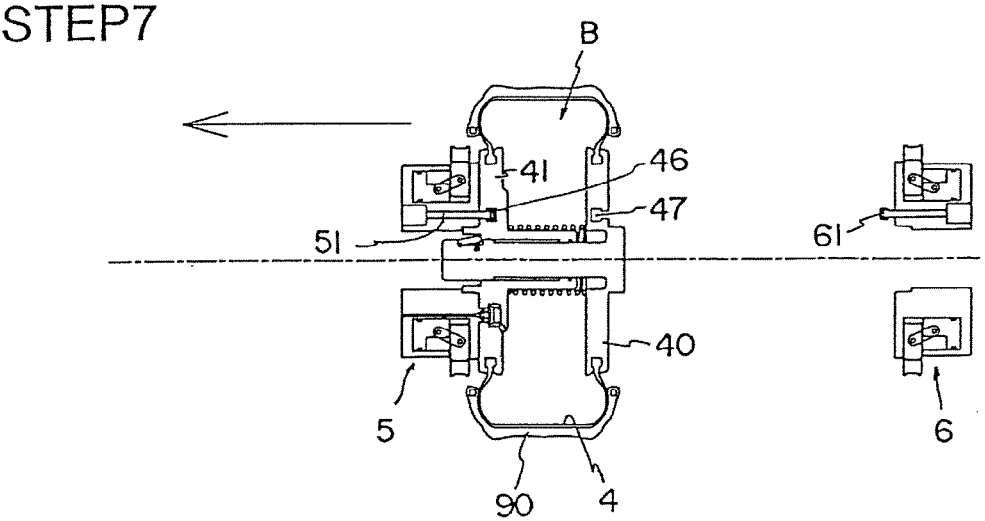
FIG. 11 is a process drawing for the first example of the tire mounting method.
Figure 12:
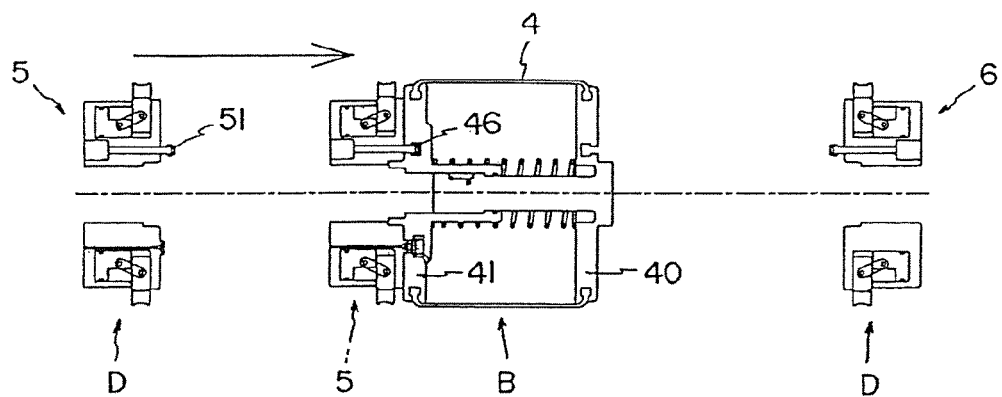
FIG. 12 is a process drawing for a second example of the tire mounting method.

(FIG. 11, Step 7)

The upper clamp ring 40 is connected with the transfer device. Then, a clamp rod (not shown) provided in the transfer device is engaged with the clamp groove 47 of the upper clamp ring 40. Thus, while the shaping unit B is captured by the transfer device, the engagement of the clamp rod 51 and the clamp groove 46 is released to separate the left clamp member 5 from the lower clamp ring 41. Then, the shaping unit B is moved to the vulcanizer body A by the transfer device.

Next, the second example of the tire mounting method in which the green tire is an intermediate green tire will be described with reference to FIGS. 12 to 18.

In the second example the intermediate green tire is a first case 91 (in which internal components of a tire as inner liner and beads are primarily molded) and a belt member 92 (mainly, components on the outer circumference of a tire such as tread).

Note that the process from STEP 2 in FIG. 13 to STEP 5 in FIG. 16 will be described since it is different from that in the first example. The rest of the processes are the same as those in the first example.

Figure 13:
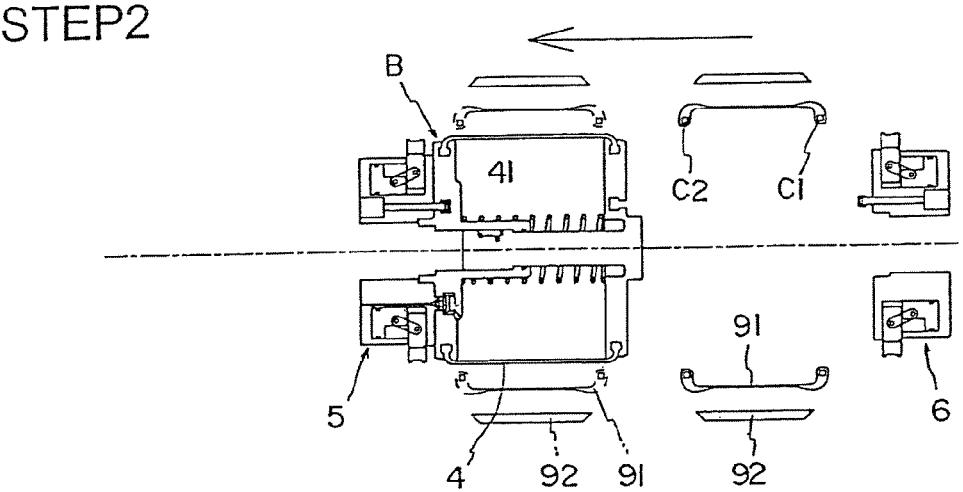
FIG. 13 is a process drawing for the second example of the tire mounting method.

(FIG. 13, Step 2)

The left clamp member 5 is connected with the shaping unit B. Then, the first case 91 and the belt member 92 assembled in a separate process are moved to the periphery of the bladder 4 of the shaping unit B.

Figure 14:
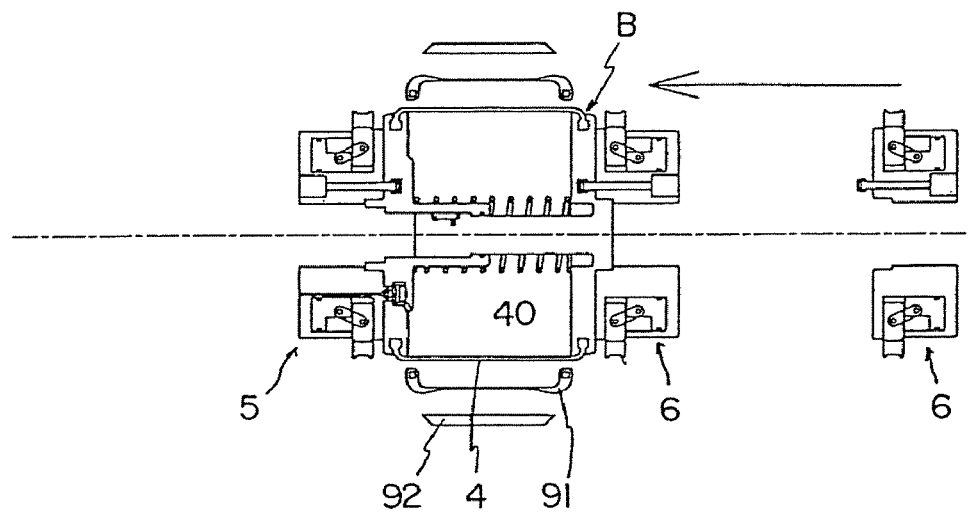
FIG. 14 is a process drawing for the second example of the tire mounting method.

(FIG. 14, Step 3)

The right clamp member 6 is connected with the shaping unit B.

Figure 15:
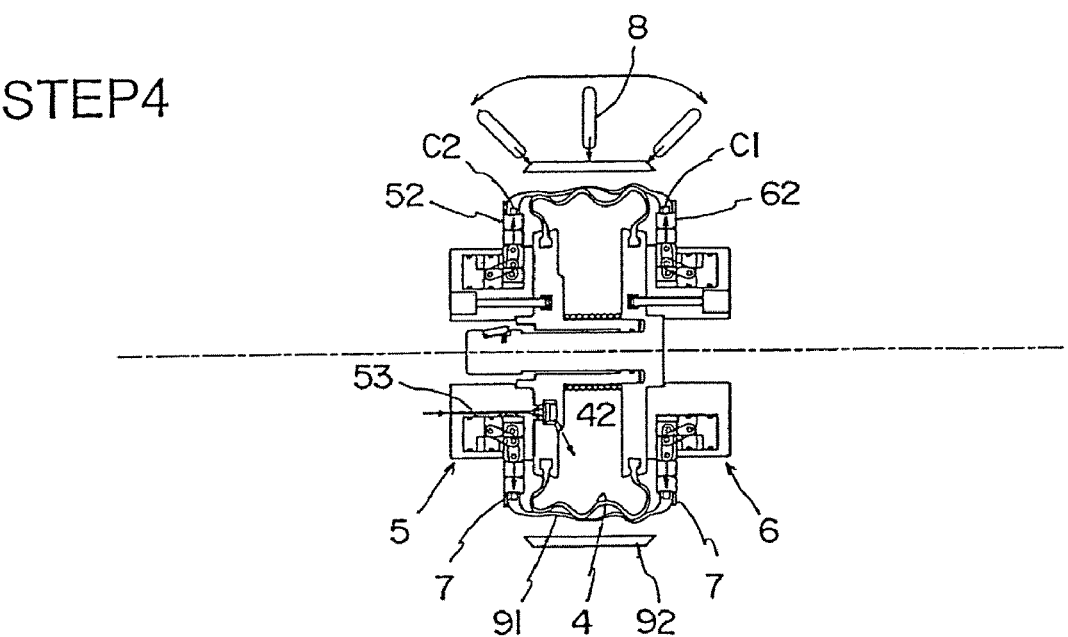
FIG. 15 is a process drawing for the second example of the tire mounting method.

(FIG. 15, Step 4)

Bead portions C1, C2 of the first case 91 are internally locked by the beadlocks 52, 62 provided in the left and right clamp members 5, 6. A receiving plate 7 is provided to prevent outward protrusion and deformation of the bead portions C1, C2.

Next, while the bladder 4 is inflated with a fluid supplied from the connection channel 53 through the fluid port 42, the left and right clamp members 5, 6 are moved in opposite directions to position the shaping unit B at the shaping position. Thereby, the first case gets inflated to abut with the belt member 92 while the outer circumference of the bladder 4 is made in tight contact with the inner circumference of the first case 91.

Next, the outer form of the belt member 92 integrated with the inflated first case 91 is adjusted by rotating the left and right clamp member 5, 6 with the rotary device and pressing the belt member 92 with a stitcher 8 (discoidal member presser).

Figure 16:
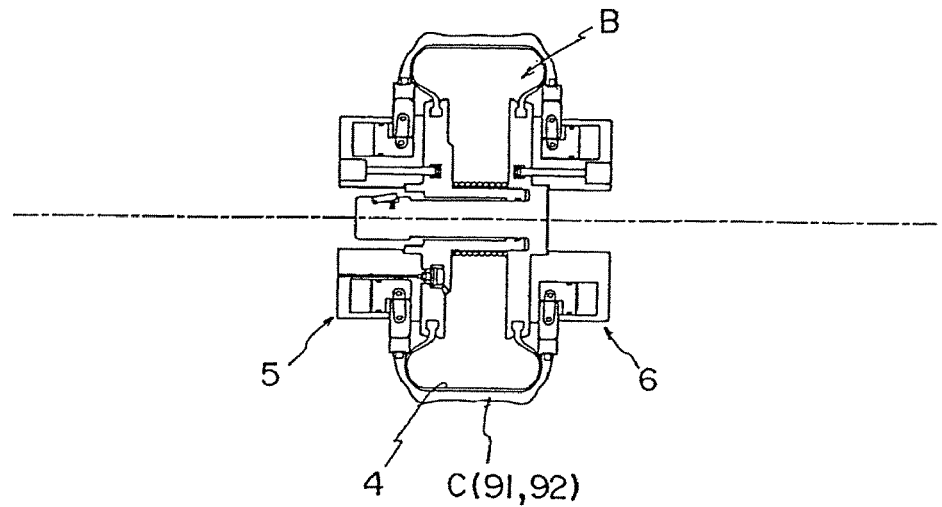
FIG. 16 is a process drawing for the second example of the tire mounting method.
Figure 17:
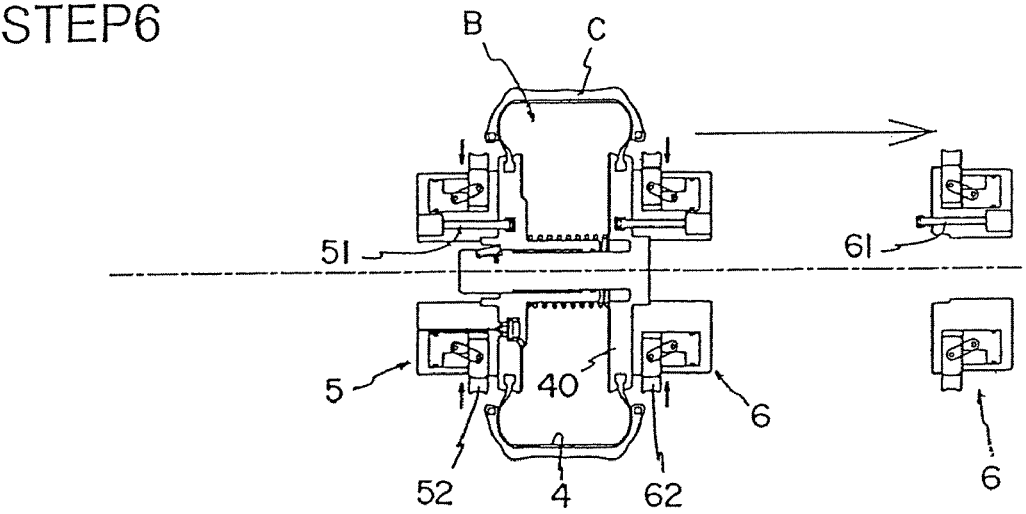
FIG. 17 is a process drawing for the second example of the tire mounting method.
Figure 18:
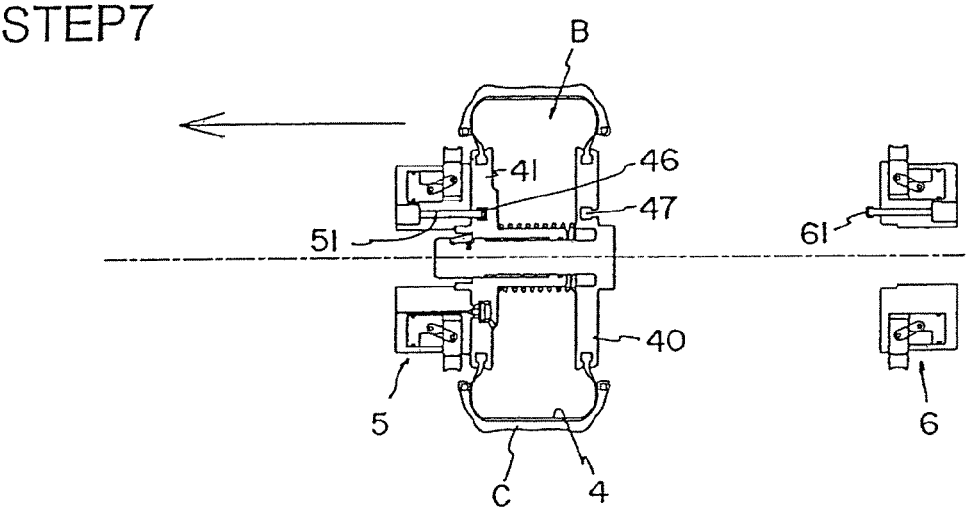
FIG. 18 is a process drawing for the second example of the tire mounting method.
Figure 19:
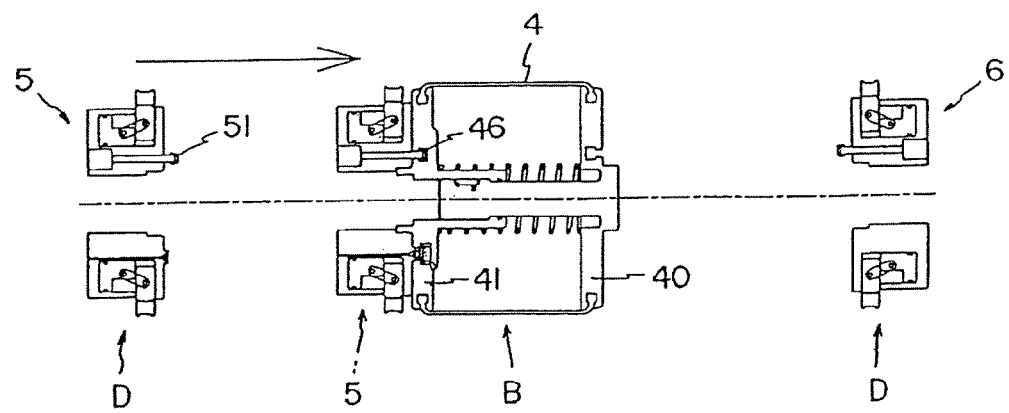
FIG. 19 is a process drawing for a third example of the tire mounting method.

(FIG. 16, Step 5)

As described above, the first case 91 and the belt member can be shaped in the shaping unit while they are assembled into a green tire at the same time.

Subsequently, the right clamp member 6 is separated from the shaping unit B and the shaping unit B gets connected with the transfer device. Then, while the shaping unit B is captured by the transfer device, the left clamp member 5 is separated from the shaping unit B, and the shaping unit B is moved to the vulcanizer body A by the transfer device.

Next, the third example of the tire mounting method in which the green tire C is another intermediate green tire will be described with reference to FIGS. 19 to 25.

In the third example the intermediate green tire is a tubular band member 93 (mainly, internal components of a tire as inner liner), a belt member 94 (mainly, components of the periphery of a tire such as tread) and ring-like beads 95.

Note that the process from STEP 2 in FIG. 20 to STEP 5 in FIG. 23 will be described since it is different from that in the first example. The rest of the processes are the same as those in the first example.

Figure 20:
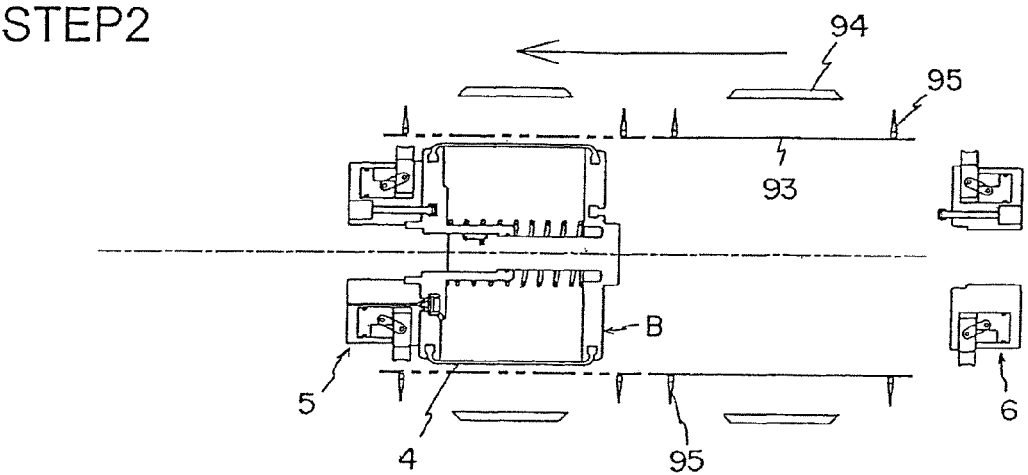
FIG. 20 is a process drawing for the third example of the tire mounting method.

(FIG. 20, Step 2)

After the left clamp member 5 is connected with the shaping unit B, the tubular band member 93, the belt member 94 and the ring-like beads 95 are moved to the periphery of the bladder 4.

Figure 21:
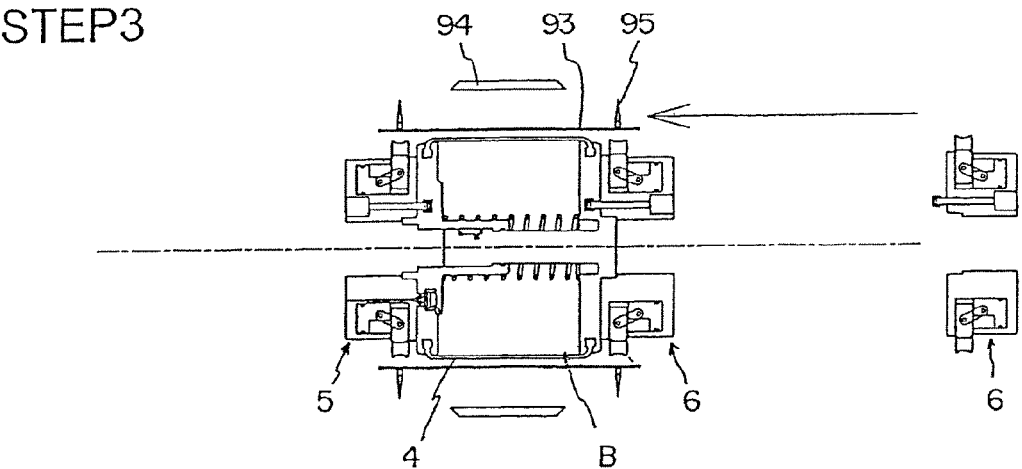
FIG. 21 is a process drawing for the third example of the tire mounting method.

(FIG. 21, Step 3)

The right clamp member 6 is connected with the shaping unit B.

Figure 22:
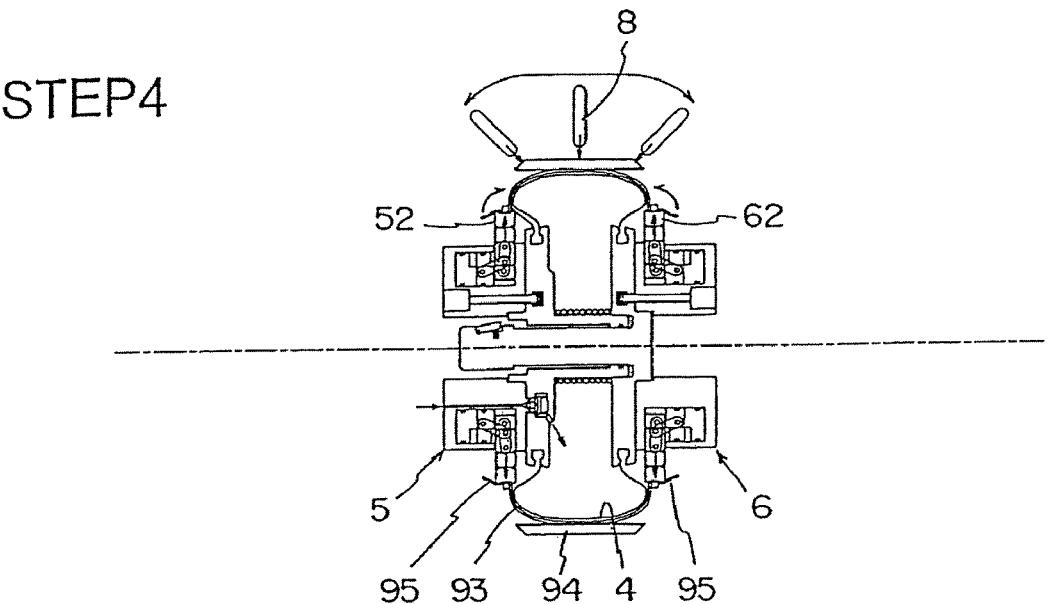
FIG. 22 is a process drawing for the third example of the tire mounting method.

(FIG. 22, Step 4)

The ring-like beads 95, 95 are internally locked by beadlocks 52, 62 provided in the left and right clamp members 5, 6. Then, while the bladder 4 is inflated with a fluid supplied from the connection channel 53 through the fluid port 42, the left and right clamp members 5, 6 are moved in opposite directions to position the shaping unit B at the shaping position. Thereby, the band member 93 gets inflated to abut with the belt member 94 while the outer circumference of the bladder 4 is made in tight contact with the inner circumference of the band member 93.

Next, the outer form of the belt member 94 integrated with the inflated band member 93 is adjusted by rotating the left and right clamp member 5, 6 by the rotary device and pressing the belt member 94 with a stitcher 8 (discoidal member presser).

Then, the band member 93 outside the beads 95, 95 is turned up by turn-up means (turn-up bladder, mechanical turn-up or the like), attached to the side surface of the belt member 94, and molded by pressing the stitcher 8.

Note that there is another way that first, the band member 93 is turned up and stitched, and then the belt member 94 is moved and stitched by expanding the band member 93 and internally attaching it thereto.

Figure 23:
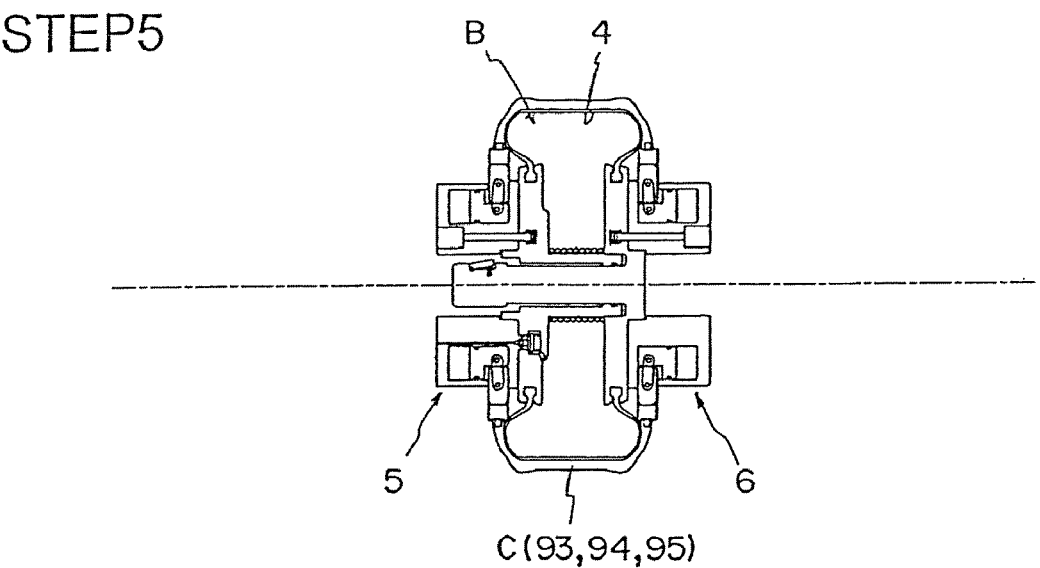
FIG. 23 is a process drawing for the third example of the tire mounting method.
Figure 24:
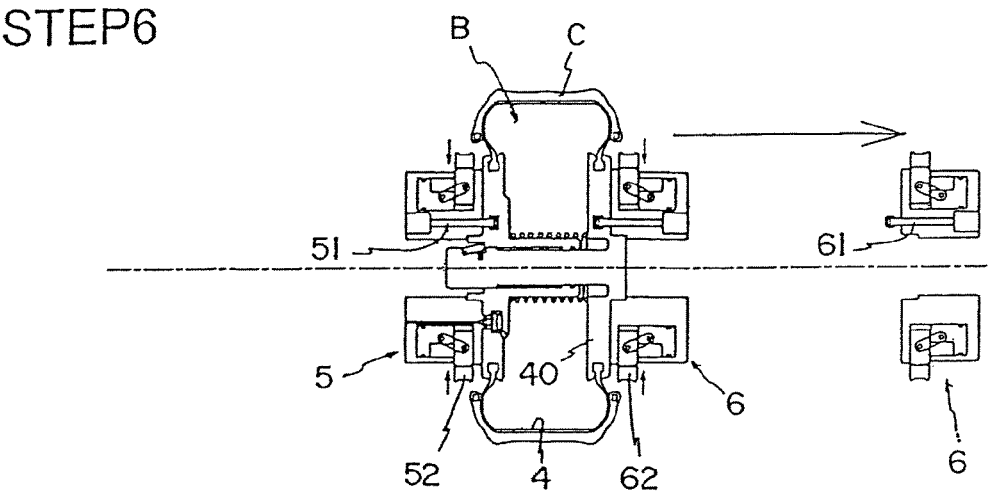
FIG. 24 is a process drawing for the third example of the tire mounting method.
Figure 25:
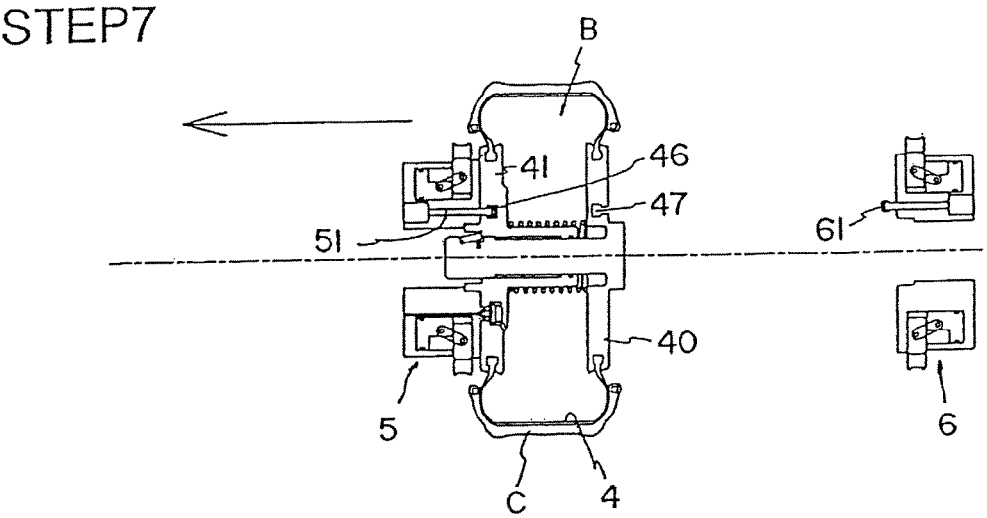
FIG. 25 is a process drawing for the third example of the tire mounting method.

(FIG. 23, Step 5)

As described above, the band member 93, the belt member 94 and the ring-like beads 95 can be shaped on the shaping unit while they are assembled into a green tire at the same time.

Subsequently, the right clamp member 6 is separated from the shaping unit B and the shaping unit B is connected with the transfer device. Then, while the shaping unit B is captured by the transfer device, the left clamp member 5 is separated from the shaping unit B. The shaping unit B is moved to the vulcanizer body A by the transfer device.

With use of the intermediate green tire as above, the intermediate green tire is shaped while molded into the green tire C so that it is possible to accurately mount the molded green tire C in the shaping unit B without directional and positional displacements.

Further, the shaping unit B is set in the vulcanizer body A after shaping the green tire C as described above, and the green tire C is vulcanized with the vulcanizer body A. After completion of the vulcanization, the vulcanized green tire C is removed from the shaping unit B, and the shaping unit B is moved to the tire mounting device by the transfer device to mount the green tire in the shaping unit B for shaping.

In addition, the vulcanized tire removed from the shaping unit B is carried to a not-shown cooling device.

INDUSTRIAL AVAILABILITY

The tire vulcanizer according to the present invention is configured to mount a green tire in the shaping unit outside the vulcanizer body and comprises, outside the vulcanizer body, the tire mounting device to mount a green tire in the shaping unit.

Separately providing the tire mounting device and the shaping unit as above makes it possible to simplify the structure of the shaping unit.

Further, the green tire is shaped while the right and left bead portions thereof are locked by the beadlocks of the tire mounting device. This makes it possible to accurately mount the green tire in the shaping unit and accurately shape the green tire accordingly.

As a result, when the shaping unit is placed in the container of the vulcanizer body, the green tire can be placed accurately in the lower container of the vulcanizer body without positional and directional displacements, enabling molding of high-performance tires through the vulcanization.

Further, according to the present invention, the green tire set in the periphery of the bladder of the shaping unit can be the molded green tire assembled in a separate process or the intermediate green tire assembled in a separate process.

With use of the molded green tire, adjusting the outer form thereof after completion of the shaping makes it possible to obtain a green tire with good finish.

With use of the intermediate green tire, the intermediate green tire is shaped while molded into the green tire, therefore, the molded green tire can be accurately mounted in the shaping unit without directional and positional displacements.

When the bead portions are locked with the beadlocks of the tire mounting device, the bead portions may outwardly protrude and be deformed. With the provision of the receiving plate holding the outer surface of the bead portions—, it is possible to prevent the deformation of the bead portions due to the protrusion. Although the present invention has been described in terms of exemplary embodiments, it is not limited thereto. It should be appreciated that variations may be made in the embodiments described by persons skilled in the art without departing from the scope of the present invention as defined by the following claims.

The invention claimed is:

1. A tire vulcanizer comprising a shaping unit including a bladder made of inflatable tubular rubber, a clamp ring which fixes one end of the bladder, a clamp ring which fixes the other end of the bladder, and a fluid supply/discharge channel through which a pressurized fluid is supplied/discharged to/from an inside of the bladder, in which a green tire is mounted and shaped in the shaping unit outside a vulcanizer body and then the green tire is vulcanized in a state that the shaping unit is moved and set in the vulcanizer body, the tire vulcanizer further comprising a tire mounting device which mounts the green tire in the shaping unit outside the vulcanizer body and comprises right and left clamp members being detachable from the clamp rings respectively and rotatable, wherein:

the right and left clamp members incorporate beadlocks which lock right and left bead portions of the green tire set in a periphery of the bladder of the shaping unit by directly engaging them with lock nails, and position the right and left bead portions at shaping positions; and one of the right and left clamp members has formed therein a connection channel which is connected with the fluid supply/discharge channel of the shaping unit to supply a fluid to inside of the bladder and inflate the bladder in a state that the right and left bead portions are locked with the beadlocks, so that the outer circumference of the inflated bladder is made in tight contact with an inner circumference of the green tire for shaping the green tire.

2. A tire vulcanizer according to claim 1, further comprising a stitcher which adjusts an outer form of the molded green tire after shaping of the molded green tire is completed.

3. A tire vulcanizer according to claim 1, further comprising a receiving plate which prevents outer surface of the bead portions from outwardly protruding when the bead portions are locked by the beadlocks.

4. A tire vulcanizer according to claim 2, further comprising a receiving plate which prevents outer surface of the bead portions from outwardly protruding when the bead portions are locked by the beadlocks.

5. A tire vulcanizer comprising:

a shaping unit including a bladder made of inflatable tubular rubber, a clamp ring which fixes one end of the bladder, a clamp ring which fixes the other end of the bladder, and a fluid supply/discharge channel through which a pressurized fluid is supplied/discharged to/from an inside of the bladder, in which a green tire component is mounted and shaped in the shaping unit outside a vulcanizer body and then the green tire component is vulcanized in a state that the shaping unit is moved and set in the vulcanizer body; and a tire mounting device which mounts the green tire component in the shaping unit outside the vulcanizer body and comprises right and left clamp members being detachable from the clamp rings respectively and rotatable; and wherein the right and left clamp members incorporate beadlocks which lock right and left bead portions of the green tire component set in a periphery of the bladder of the shaping unit by directly engaging them with lock nails, and position the right and left bead portions at shaping positions; and one of the right and left clamp members has formed therein a connection channel which is connected with the fluid supply/discharge channel of the shaping unit to supply a fluid to inside of the bladder and inflate the bladder in a state that the right and left bead portions are locked with the beadlocks, so that the outer circumference of the inflated bladder is made in tight contact with an inner circumference of the green tire component for shaping the green tire component.

6. A tire vulcanizer according to claim 5, further comprising a receiving plate which prevents outer surface of the bead portions from outwardly protruding when the bead portions are locked by the beadlocks.

* * * * *